(12) United States Patent
Herrington et al.

(10) Patent No.: US 12,157,093 B2
(45) Date of Patent: Dec. 3, 2024

(54) COMPOSITE MEMBRANES

(71) Applicant: Aqua Membranes, Inc., Albuquerque, NM (US)

(72) Inventors: Rodney Herrington, Albuquerque, NM (US); Kevin Roderick, Albuquerque, NM (US)

(73) Assignee: Aqua Membranes, Inc., Albuquerque, NM (US)

( * ) Notice: Subject to any disclaimer, the term of this patent is extended or adjusted under 35 U.S.C. 154(b) by 520 days.

(21) Appl. No.: 17/424,685

(22) PCT Filed: Jan. 27, 2020

(86) PCT No.: PCT/US2020/015229
§ 371 (c)(1),
(2) Date: Jul. 21, 2021

(87) PCT Pub. No.: WO2020/154734
PCT Pub. Date: Jul. 30, 2020

(65) Prior Publication Data
US 2022/0105472 A1    Apr. 7, 2022

Related U.S. Application Data

(60) Provisional application No. 62/797,357, filed on Jan. 27, 2019.

(51) Int. Cl.
*B01D 69/12*    (2006.01)
*B01D 65/00*    (2006.01)
*B01D 67/00*    (2006.01)
*B01D 69/02*    (2006.01)
(Continued)

(52) U.S. Cl.
CPC ....... *B01D 69/1216* (2022.08); *B01D 65/003* (2013.01); *B01D 67/0002* (2013.01); *B01D 69/02* (2013.01); *B01D 69/1071* (2022.08); *B01D 69/12* (2013.01); *B01D 71/68* (2013.01); *B01D 2313/08* (2013.01);
(Continued)

(58) Field of Classification Search
CPC .............. B01D 69/1216; B01D 63/103; B01D 65/003; B01D 67/0002; B01D 69/02; B01D 69/1071; B01D 69/12; B01D 71/68; B01D 69/10; B01D 2313/08; B01D 2313/14; B01D 2313/143; B01D 2325/08
USPC ..................................... 210/500.41
See application file for complete search history.

(56) References Cited

U.S. PATENT DOCUMENTS

| | | |
|---|---|---|
| 3,963,621 A | 6/1976 | Newman |
| 4,187,173 A | 2/1980 | Keefer |
| 4,208,289 A | 6/1980 | Bray |

(Continued)

FOREIGN PATENT DOCUMENTS

| | | |
|---|---|---|
| CA | 2662925 A1 | 1/2009 |
| CA | 2825674 C | 8/2011 |

(Continued)

OTHER PUBLICATIONS

Machine-generated English translation of EP 0081182, generated on Apr. 23, 2024.*

*Primary Examiner* — Fred Prince
(74) *Attorney, Agent, or Firm* — V Gerald Grafe

(57) ABSTRACT

Embodiments of the present invention provide the integration of the function of the feed spacer, the permeate carrier, or both, as a part of the membrane sheet in a spiral wound membrane element.

25 Claims, 3 Drawing Sheets

(51) Int. Cl.
*B01D 69/10* (2006.01)
*B01D 71/68* (2006.01)
(52) U.S. Cl.
CPC .... *B01D 2313/14* (2013.01); *B01D 2313/143* (2013.01); *B01D 2325/08* (2013.01)

(56) References Cited

U.S. PATENT DOCUMENTS

| | | |
|---|---|---|
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,861,487 A * | 8/1989 | Fulk, Jr. ............... B01D 63/10 210/321.74 |
| 4,869,821 A | 9/1989 | Korin |
| 4,874,514 A | 10/1989 | Casey Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |

(56) References Cited

U.S. PATENT DOCUMENTS

| | | |
|---|---|---|
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,335,301 B2 | 2/2008 | Cheng |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2004/0011723 A1* | 1/2004 | Bradford .......... B41J 3/407 210/493.4 |
| 2008/0290031 A1 | 11/2008 | Popa |
| 2012/0328844 A1* | 12/2012 | Zounek .......... B01D 63/08 55/482 |
| 2013/0334128 A1 | 12/2013 | Takagi et al. |
| 2015/0343388 A1 | 12/2015 | Hester et al. |
| 2016/0008763 A1 | 1/2016 | Roderick et al. |
| 2016/0236132 A1 | 8/2016 | Hara et al. |

FOREIGN PATENT DOCUMENTS

| | | |
|---|---|---|
| EP | 0081182 B1 * | 7/1986 |
| EP | 2902094 | 8/2015 |
| WO | WO2010047360 A1 | 4/2010 |
| WO | WO2015016253 A1 | 2/2015 |
| WO | WO2002/055179 | 8/2015 |
| WO | WO2016199272 A1 | 12/2016 |
| WO | WO2017087461 A1 | 5/2017 |
| WO | WO2017/211738 | 12/2017 |
| WO | WO2018/194911 | 10/2018 |
| WO | WO2018/195367 | 10/2018 |

* cited by examiner

COMPOSITE MEMBRANES

CROSS-REFERENCE TO RELATED APPLICATIONS

This application is a national stage application under 35 U.S.C. 371 of PCT application PCT/US20/15229, filed 27 Jan. 2020, which claims priority to U.S. provisional application 62/797,357, filed 27 Jan. 2019. Each of the foregoing is incorporated by reference herein.

FIELD OF THE INVENTION

The subject invention relates to a permeable membrane system utilized for the separation of fluid components, specifically spiral-wound membrane elements. The present invention is related to those described in U.S. provisional 61/771,041, filed Feb. 28, 2013, and to U.S. provisional 62/797,357, filed Jan. 27, 2019, each of which is incorporated herein by reference.

DESCRIPTION OF RELATED ART

Spiral-wound membrane filtration elements known in the art comprise a laminated structure with a membrane sheet sealed to or around a porous permeate spacer which creates a path for removal of the fluid passing through the membrane to a central tube, while this laminated structure is wrapped spirally around the central tube and spaced from itself with a porous feed spacer to allow axial flow of the fluid through the element. While this feed spacer is necessary to maintain open and uniform axial flow between the laminated structure, it is also a source of flow restriction and pressure drop within the axial flow channel and also presents areas of restriction of flow and contact to the membrane that contribute significantly to membrane fouling via biological growth, scale formation, and particle capture. In pressure retarded osmosis (PRO), forward osmosis (FO), and reverse osmosis (RO) applications, flow paths in the feed spaces and the permeate spacer may be beneficial to optimal system operation.

Improvements to the design of spiral wound elements have been disclosed by Barger et al. and Bradford et al., which replace the feed spacer with islands or protrusions either deposited or embossed directly onto the outside or active surface of the membrane. This configuration can be advantageous in that it maintains spacing for axial flow through the element while minimizing obstruction within the flow channel. It also eliminates the porous feed spacer as a separate component, thus simplifying element manufacture. Patent publication number US2016-0008763-A1 entitled Improved Spiral Wound Element Construction, incorporated herein by reference, teaches the application of printed patterns on the back side of the active surface of the membrane sheet, or directly on the surface of the permeate spacer.

The membrane sheet itself is typically made in three layers. A first porous layer can be composed, for example of polyester, followed by a porous support layer of polysulfone, and finally the membrane polymer layer deposited on the polysulfone substrate. The polymer coating has usually been applied by casting methods. Three-dimensional (3D) printing technology has now progressed to the point that membrane polymer material can be printed directly on the polysulfone substrate. Printing of the polymer coating on the polysulfone substrate has been described by Chris Arnush with the Zukerberg Institute of Water Technology of Ben Gurion University in a paper entitled "2-D and 3-D Printing Assisted Fabrication and Modification of UF/NF/RO Membranes for Water Treatment". Polyamide coatings applied by electrospray have also been described by Jeffery McCutcheon with the University of Connecticut. The following references, each of which is incorporated herein by reference, can facilitate understanding of the invention: U.S. Pat. Nos. 3,962,096; 4,476,022; 4,756,835; 4,834,881; 4,855,058; 4,902,417; 4,861,487; 6,632,357; and US application 2016-0008763-A1.

DESCRIPTION OF THE INVENTION

A conventional spiral wound membrane element typically comprises three components, a membrane sheet, a feed spacer, and a permeate carrier. A membrane sheet typically comprises a porous polyethylene layer, for example, a polysulfone layer and, for example, a polymer layer cast onto the polysulfone layer. The present invention provides a system with a 3-layer membrane sheet that can integrate all of the features of the membrane element, the polymer membrane, the permeate carrier, and the feed spacer in one composite assembly. The polysulfone layer can incorporate feed spacer patterns. The porous, typically non-woven, polyethylene layer can be thicker than conventional polyethylene layers and incorporate the feature of the permeate carrier as an integral part rather than a separate permeate carrier sheet. The permeate carrier can also integrate channels printed or fabricated in the permeate carrier to direct flow through the permeate carrier in specific flow paths which can be useful, as examples, in pressure retarded osmosis and forward osmosis applications. In an example embodiment, the membrane layer, the permeate carrier, and the feed spacer are integrated on one composite sheet. Casting has been the industry standard method for applying polymer membrane coatings over the past 50 years.

In some spiral-wound membrane separation applications which involve serial flow through the permeate spacer layer of successive elements such as that described in the PRO patent listed above, it can be advantageous to have lower resistance to flow than is exhibited by traditional woven permeate spacer fabrics, while maintaining other characteristics including resistance to deformation under high external pressure. Additionally, the ability to tailor flow channels of arbitrary shape within the permeate spacer can allow for controllable distribution of flow through the permeate spacer layer. Embodiments of the present invention provide channels printed, deposited onto or integrated into the porous permeate spacer to create positive feed channels in the permeate spacer. In other embodiments, the material creating the channels can be photopolymers, hot melt polyolefins, curable polymers or adhesives, or other materials.

MODES FOR CARRYING OUT THE INVENTION AND INDUSTRIAL APPLICABILITY

Figure 1:
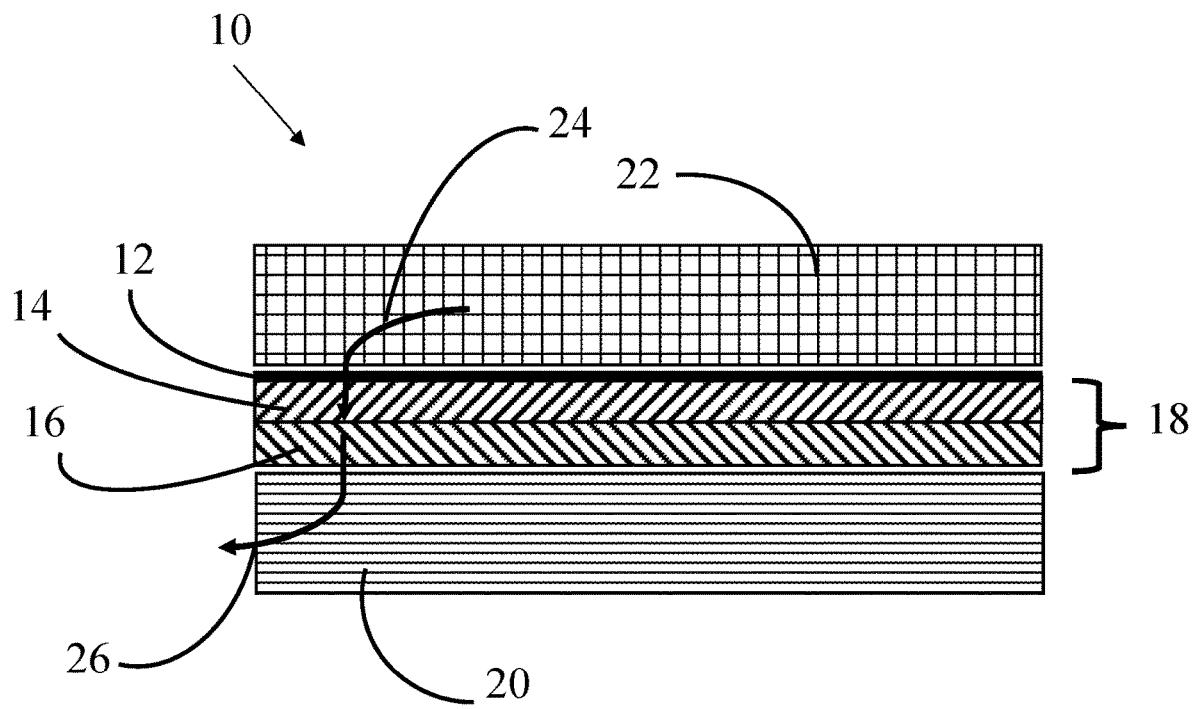
FIG. 1 shows a cross-section view comprising a conventional 3-layer membrane sheet, and feed spacer sheet, and a permeate carrier sheet.

Embodiments of the present invention provide a membrane element comprising: (a) a porous polysulfone layer with a plurality of spacing features integrated on a first surface of the polysulfone layer; (b) a porous polymer filtration layer disposed on the first surface of the polysulfone layer; and (c) a porous support layer mounted in contact with a second surface of the polysulfone layer, where the second surface of the polysulfone layer is opposite the first surface of the polysulfone layer. In some embodiments, the support layer comprises polyethylene. In some embodiments, the support layer comprises a mesh material. In some embodiments, the support layer has a permeability that is greater in a portion of the support layer proximal the polysulfone layer than in a portion of the support layer distal from the poylsulfone later.

Some embodiments further comprise one or more substantially impermeable barrier features disposed within the support layer, wherein the barrier features define fluid flow paths within the support layer. In some embodiments, the barrier features disposed within the support layer do not extend into the polysulfone layer, and the support layer comprises non-woven polyester.

Some embodiments further comprise a permeate carrier layer having one or more substantially impermeable barrier features disposed within the permeate carrier layer, and wherein the permeate carrier layer is bonded to the porous support layer on a surface of the porous support layer opposite the surface of the porous support layer in contact with the polysulfone layer. In some embodiments, the spacing features are disposed on only one half of the first surface of the polysulfone layer. In some embodiments, a first subset of the spacing features are disposed near an inlet edge, an outlet edge, or both, of the polysulfone membrane, and wherein spacing features in the first subset have a first height; and wherein a second subset of the spacing features are disposed on no more than one half of the first surface of the polysulfone membrane and wherein spacing features in the second subset have a second height, wherein the second height is twice the first height.

Some embodiments provide a filtration element comprising the membrane element as described above folded near the middle of the length of the membrane element such that the porous filtration layer is inside the folded membrane element. Some embodiments further comprise a collection tube, wherein the folded membrane element is placed with its support layer in contact with the collection tube and the folded membrane element is spirally wound around the collection tube. Some embodiments further comprise one or more additional membrane elements of claim 1, wherein each additional membrane element is placed with its support layer in contact with the collection tube and each additional membrane element is spirally wound around the collection tube. Some embodiments further comprise a fold protection element disposed on the porous filtration layer near the fold line. Some embodiments further comprise a bridge support pattern of spacers disposed on the membrane sheet at the end distal from the fold line.

Embodiments of the present invention provide a method of making a membrane element, comprising: (a) placing a plurality of spacing features on a first surface of a polysulfone layer; (b) bonding a porous polymer filtration layer to the first surface of the polysulfone layer; and (c) bonding a porous support layer with a second surface of the polysulfone layer, where the second surface of the polysulfone layer is opposite the first surface of the polysulfone layer. In some embodiments, the support layer comprises polyethylene. In some embodiments, the support layer comprises a mesh material. In some embodiments, the support layer has a permeability that is greater in a portion of the support layer proximal the polysulfone layer than in a portion of the support layer distal from the poylsulfone layer.

Some embodiments further comprise forming one or more substantially impermeable barrier features within the support layer, wherein the barrier features define fluid flow paths within the support layer, prior to step (c). Some embodiments further comprise forming one or more substantially impermeable barrier features within a permeate carrier, and bonding the permeate carrier to the porous support layer on a surface of the porous support layer opposite the surface of the porous support layer in contact with the polysulfone layer. In some embodiments, the spacing features are disposed on only one half of the first surface of the polysulfone layer. In some embodiments, a first subset of the spacing features are disposed near an inlet edge, an outlet edge, or both, of the polysulfone membrane, and wherein spacing features in the first subset have a first height; and wherein a second subset of the spacing features are disposed on no more than one half of the first surface of the polysulfone membrane and wherein spacing features in the second subset have a second height, wherein the second height is twice the first height.

Some embodiments provide a method of making a filtration element comprising: (a) providing a membrane element according to the methods described above; (b) folding the membrane element near the middle of the length of the membrane element such that the porous filtration layer is inside the folded membrane element. Some embodiments further comprise placing the folded membrane element with its support layer in contact with a collection tube, and spirally winding the folded membrane element around the collection tube. Some embodiments further comprise providing one or more additional membrane elements according to the method described above; folding each of the additional membrane elements near the middle of the length of such membrane element such that its porous filtration layer is inside the folded membrane element; placing each additional membrane element with its support layer in contact with the collection tube; and spirally winding the additional membrane elements around the collection tube. Some embodiments further comprise placing a fold protection element on the porous filtration layer near the fold line.

Some embodiments further comprise placing a bridge support pattern of spacers on the membrane sheet at the end distal from the fold line.

In a representative embodiment of an existing reverse osmosis spiral wound membrane elements shown in FIG. 1, spiral wound element composite layers 10 comprise a membrane sheet assembly 18 comprising a porous polyethylene layer 16, for example, bonded to a porous polysulfone layer 14, for example, and coated with a cast-in-place polymer membrane layer 12. In order for feed water to be distributed evenly to polymer membrane layer 12, feed spacer mesh 22, for example, is placed against the surface of polymer membrane layer 12. As feed solution fluid 24 is transferred through polymer membrane layer 12, and impurities are rejected at polymer membrane layer 12, filtrate fluid 26 is transferred to separate permeate carrier 20. In practice, this membrane assembly is sealed around permeate carrier 20 by adhesive to avoid loss of the clean solution, and then the flat envelopes are rolled around a center tube where the clean product water enters and is collected in a membrane element housing.

Figure 2:
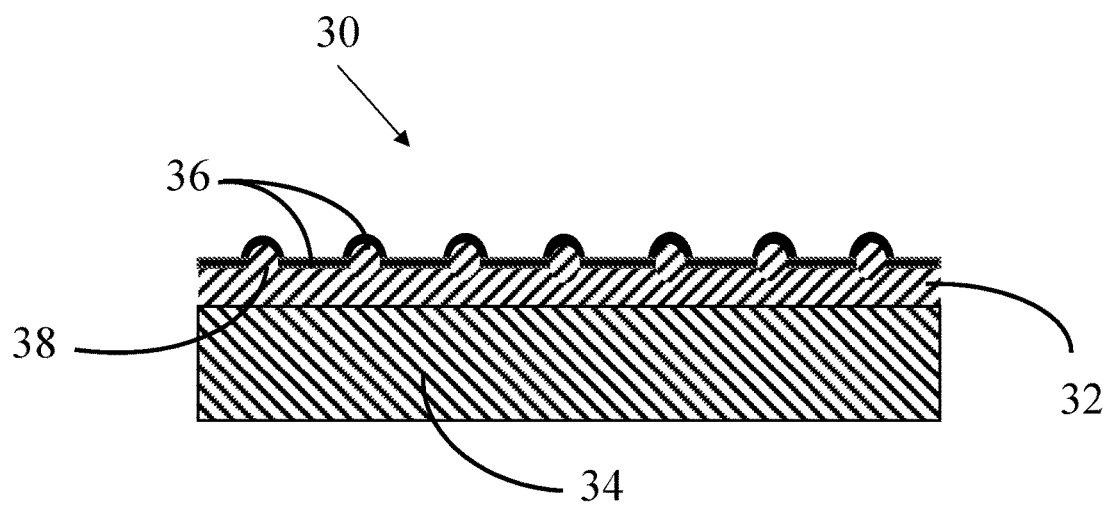
FIG. 2 is a cross section view of a composite membrane sheet comprising a porous polyethylene layer, a polysulfone layer with features integrated into the layer, and a porous polyamide filtration layer.

In an example embodiment of the present invention shown in FIG. 2, composite membrane sheet 30 comprises spacer features 38 integrated into layer 32, for example made of porous polysulfone. Polymer layer 36 can be applied by processes such as spraying, electrospraying, or printing directly on support layer 32. Polymer layer 36 can be printed with features such as those taught by Arnush, et al., that provide anti-fouling characteristics to polymer layer 36. Polymer layer 36 can also comprise anti-fouling biocides as taught by Bradford, et al. In one example embodiment, composite membrane sheet 30 can also comprise a support layer 34, made of polyethylene, for example, that is sufficiently thick and porous to also act as an integrated permeate carrier layer. Support layer 34 can also have graded density characteristics that become more porous or more permeable (less dense) as the support layer material is located more distal perpendicular to polymer layer 34. The more porous or more permeable portion of the support layer 34 can be treated in order to make it more rigid and capable of supporting high pressure without losing porosity or permeability with a stiffening agent such as an epoxy coating, for example. In another example embodiment, composite membrane sheet 30 can comprise a permeate carrier layer, for example made of separate woven polyester or other material, that is laminated to the support layer during production. In cases where a permeate carrier layer is integrated or laminated into the composite membrane sheet, the effective thickness of the permeate carrier layer need only be ½ the thickness of a conventional permeate carrier layer to provide the same flow because the folded and rolled composite membrane places two such permeate carrier layers in contact with one another to create the permeate flow space.

Figure 3:
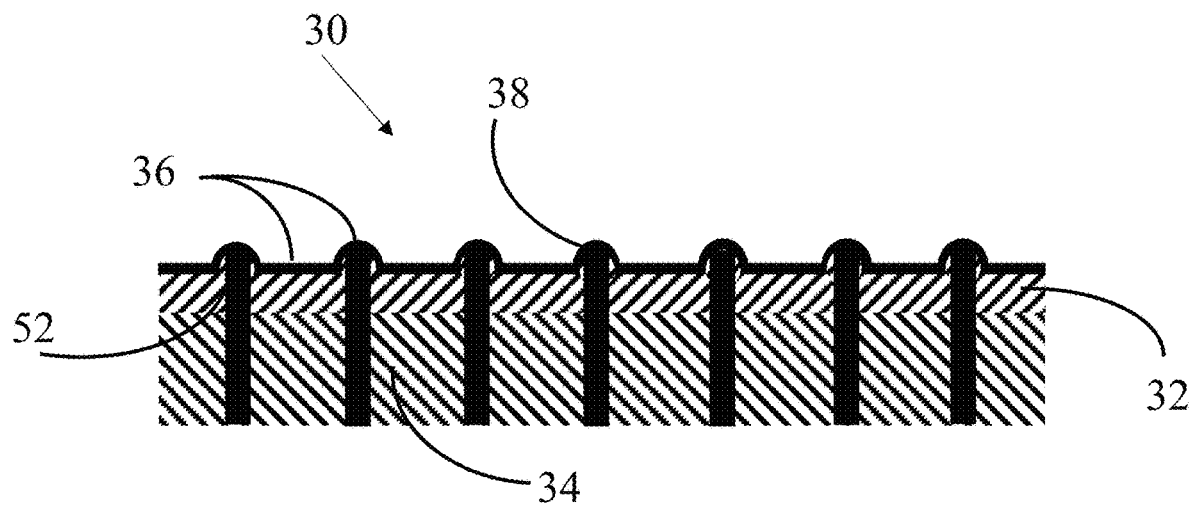
FIG. 3 is a cross section view of a 3D printed material in the interstitial space and protruding above the permeate spacer of a composite membrane sheet assembly with integral feed spacer features and a thick permeate carrier integral to the membrane sheet with flow channels integrated in the permeate carrier.

In an example embodiment of the present invention shown in FIG. 3, composite membrane sheet 30 can comprise barrier patterns 52 within support layer 34 that channel fluid flow in certain flow pathways within support layer 34, for example to facilitate improvements in efficiency for pressure retarded osmosis (PRO) applications or forward osmosis (FO) applications. In another example embodiment of the present invention, support layer 34 with barrier patterns 52 can be fabricated separately, and then porous polysulfone layer 32 can be subsequently bonded to support layer 34.

Figure 4:
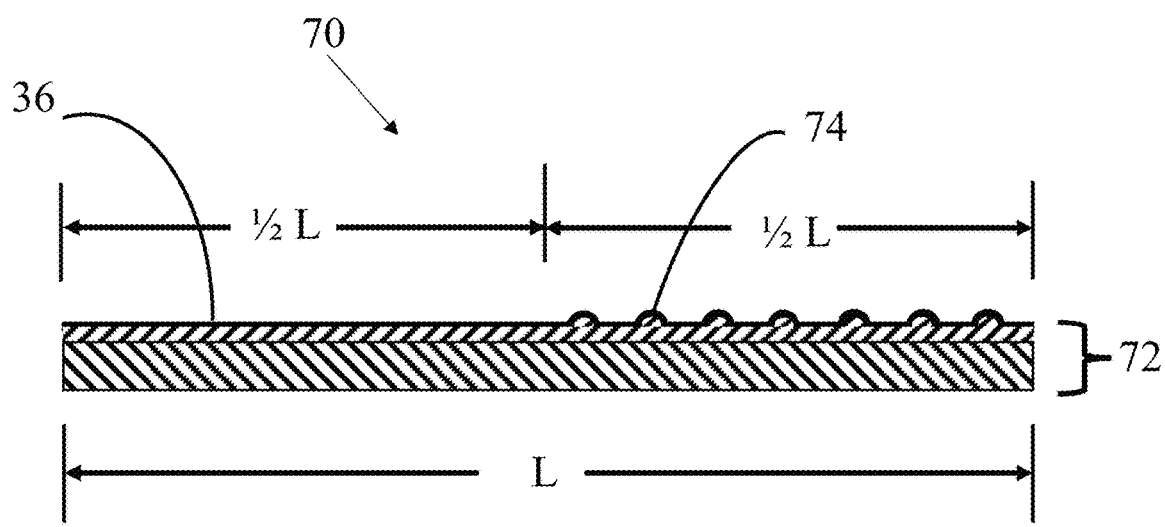
FIG. 4 is a cross section view of a composite membrane sheet with feed spacer features applied on one half of the length of the membrane sheet assembly.

In an example embodiment of the present invention shown in FIG. 4, membrane sheet assembly 70 can have feed spacer features 74 applied over only half of the length of composite membrane 72. In the assembly of a spiral wound element, each leaf is folded in half. By applying feed spacer features 74 over only half of composite membrane 72, interference of spacer features 74 will be avoided as the folded leaf is rolled around the center tube of a spiral wound element. On the inlet and outlet edges of composite membrane 72, special spacer features 74 comprising lines, dots, or other patterns can be fabricated at only half height along the full length of composite membrane 72 so that the patterns in the inlet and outlet regions of the membrane feed space will be established such that they interfere appropriately to provide support for the glue layer that seals the permeate carrier envelope. In the open area of membrane sheet 70, between the inlet and outlet regions of the membrane sheet, spacer features 74 can be full height and only printed on half the length of composite membrane sheet 72.

Figure 5:
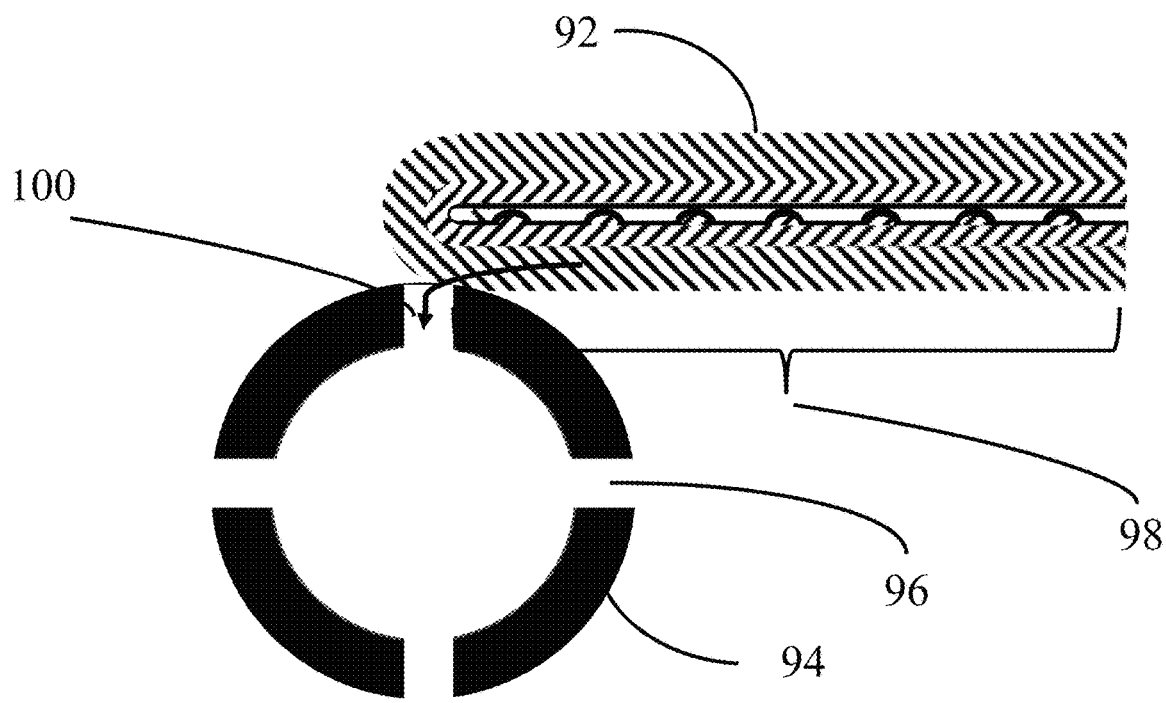
FIG. 5 is a cross section view of a composite membrane sheet integrating a polymer membrane layer, feed spacer features integrated in a support layer, an integral permeate carrier, folded at the center line, and attached to the center tube of a spiral wound membrane element.

In an example embodiment of the present invention shown in FIG. 5, composite membrane sheet 92 is folded in half and is wrapped around center tube 94. Permeate fluid 100 passage holes 96 in center tube 94 facilitate the passage of permeate fluid 100 to the center of center tube 94 for exit of permeate fluid 100 from the spiral wound element assembly. Adhesive 98 can be applied at the edges of the permeate envelope so that the adhesive penetrates the permeate carrier and bonds to the polymer coating to provide a sealed permeate carrier envelope, and also provides a seal of the permeate carrier envelope to center tube 94. It is known to those in the art of making membrane elements that multiple sheets can be wrapped starting at center tube 94 in order to make membrane elements with much more membrane sheet surface area for much larger operational capacity, for instance, 2½, 4, or 8 inch diameter elements, or any other diameters.

Figure 6:
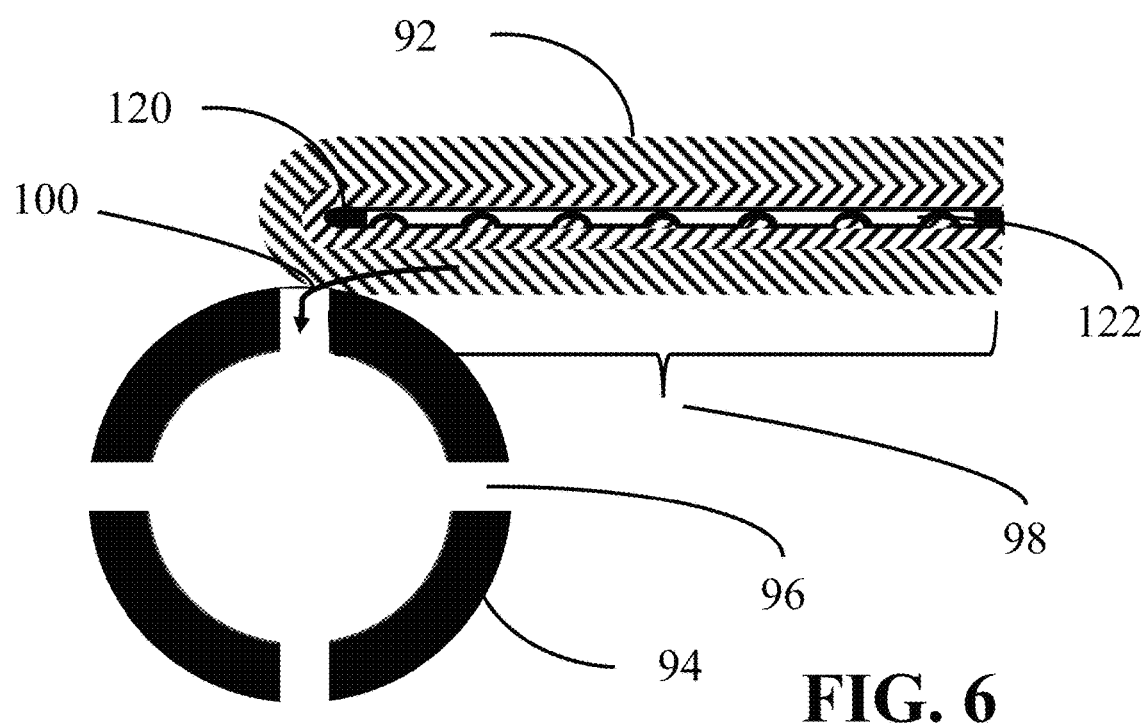
FIG. 6 is a cross section view of a composite membrane sheet integrating a polymer membrane layer, feed spacer features integrated in a support layer, an integral permeate carrier, folded at the center line, attached to the center tube of a spiral wound membrane element, and including fold protection and bridge support features.

In an example embodiment of the present invention shown in FIG. 6, folded composite membrane sheet 92 can comprise fold protection material 120 at the centerline of composite membrane sheet 92. Fold protection material 120 can comprise tape or a separate material printed or otherwise applied at the center region of composite membrane sheet 92 prior to folding. Alternately, the composite membrane sheet can comprise a fold protection which is integrated into the porous layer made of polysulfone, for example, by depositing a non-porous layer before the polyamide layer is applied. Composite membrane sheet 92 can also comprise a solid or segmented bridge support 122 printed or otherwise applied at the distal end of folded composite membrane sheet 92. Alternately, the composite membrane sheet can comprise a bridge support end pattern which is integrated into the porous layer made of polysulfone, for example.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:
1. A membrane element comprising:
 (a) a porous polysulfone layer with a plurality of spacing features integrated on a first surface of the polysulfone layer;
 (b) a porous polymer filtration layer disposed on the first surface of the polysulfone layer such that the polymer filtration layer covers both the spacing features and the polysulfone layer; and
 (c) a porous support layer mounted in contact with a second surface of the polysulfone layer, where the second surface of the polysulfone layer is opposite the first surface of the polysulfone layer;
further comprising a permeate carrier layer having one or more impermeable barrier features disposed within the permeate carrier layer, and wherein the permeate carrier layer is bonded to the porous support layer on the entirety of a surface of the porous support layer opposite the surface of the porous support layer in contact with the polysulfone layer.

2. A filtration element comprising: a membrane element comprising:
(a) a porous polysulfone layer with a plurality of spacing features integrated on a first surface of the polysulfone layer;
(b) a porous polymer filtration layer disposed on the first surface of the polysulfone layer such that the polymer filtration layer covers both the spacing features and the polysulfone layer; and further comprising
(c) a porous support layer mounted in contact with a second surface of the polysulfone layer, where the second surface of the polysulfone layer is opposite the first surface of the polysulfone layer;
wherein the membrane element is folded along a fold line near the middle of the length of the membrane element such that the porous filtration layer is inside the folded membrane element.

3. The membrane element of claim 2, wherein the support layer comprises polyethylene.

4. The membrane element of claim 2, wherein the support layer comprises a mesh material.

5. The membrane element of claim 2, wherein the support layer has a permeability that is greater in a portion of the support layer proximal the polysulfone layer than in a portion of the support layer distal from the polysulfone layer.

6. The membrane element of claim 2, further comprising one or more impermeable barrier features disposed within the support layer, wherein the barrier features define fluid flow paths within the support layer.

7. The membrane element of claim 6, wherein the barrier features disposed within the support layer do not extend into the polysulfone layer, and the support layer comprises non-woven polyester.

8. The membrane element of claim 2, wherein the spacing features are disposed on only one half of the first surface of the polysulfone layer.

9. The membrane element of claim 2, wherein a first subset of the spacing features are disposed near an inlet edge, an outlet edge, or both, of the polysulfone membrane, and wherein spacing features in the first subset have a first height; and wherein a second subset of the spacing features are disposed on no more than one half of the first surface of the polysulfone membrane and wherein spacing features in the second subset have a second height, wherein the second height is twice the first height.

10. The filtration element of claim 2, further comprising a collection tube, wherein the folded membrane element is placed with its support layer in contact with the collection tube and the folded membrane element is spirally wound around the collection tube.

11. The filtration element of claim 10, further comprising the membrane element comprising one or more additional membrane elements, wherein each additional membrane element is placed with its support layer in contact with the collection tube and each additional membrane element is spirally wound around the collection tube.

12. The filtration element of claim 2, further comprising a fold protection element disposed on the porous filtration layer near the fold line.

13. The filtration element of claim 2, further comprising a bridge support pattern of spacers disposed on the membrane element at the end distal from the fold line.

14. A method of making a membrane element, comprising:
(a) placing a plurality of spacing features on a first surface of a polysulfone layer;
(b) after step (a), bonding a porous polymer filtration layer to the first surface of the polysulfone layer such that the polymer filtration layer covers both the spacing features and the polysulfone layer; and
(c) bonding a porous support layer with a second surface of the polysulfone layer, where the second surface of the polysulfone layer is opposite the first surface of the polysulfone layer;
further comprising: folding the membrane element along a fold line near the middle of the length of the membrane element such that the porous filtration layer is inside the folded membrane element.

15. The method of claim 14, wherein the support layer comprises polyethylene.

16. The method of claim 14, wherein the support layer comprises a mesh material.

17. The method of claim 14, wherein the support layer has a permeability that is greater in a portion of the support layer proximal the polysulfone layer than in a portion of the support layer distal from the poylsulfone layer.

18. The method of claim 14, further comprising forming one or more impermeable barrier features within the support layer, wherein the barrier features define fluid flow paths within the support layer, prior to step (c).

19. The method of claim 14, further comprising forming one or more impermeable barrier features within a permeate carrier, and bonding the permeate carrier to the porous support layer on the entirety of a surface of the porous support layer opposite the surface of the porous support layer in contact with the polysulfone layer.

20. The method of claim 14, wherein the spacing features are disposed on only one half of the first surface of the polysulfone layer.

21. The method of claim 14, wherein a first subset of the spacing features are disposed near an inlet edge, an outlet edge, or both, of the polysulfone membrane, and wherein spacing features in the first subset have a first height; and wherein a second subset of the spacing features are disposed on no more than one half of the first surface of the polysulfone membrane and wherein spacing features in the second subset have a second height, wherein the second height is twice the first height.

22. The method of claim 14, further comprising placing the folded membrane element with its support layer in contact with a collection tube, and spirally winding the folded membrane element around the collection tube.

23. The method of claim 22, further comprising repeating the steps (a)-(c) one or more times to provide one or more additional membrane elements; folding each of the additional membrane elements near the middle of the length of such membrane element such that its porous filtration layer is inside the folded membrane element; placing each additional membrane element with its support layer in contact with the collection tube; and spirally winding the additional membrane elements around the collection tube.

24. The method of claim 14, further comprising placing a fold protection element on the porous filtration layer near the fold line.

25. The method of claim 14, further comprising placing a bridge support pattern of spacers on the membrane element at the end distal from the fold line.

* * * * *